United States Patent [19]

Stöhr et al.

[11] 4,435,334
[45] Mar. 6, 1984

[54] NAPHTHOLSULPHONIC ACID COMPOUNDS, THEIR PREPARATION AND USE AS COUPLING COMPONENTS

[75] Inventors: Frank-Michael Stöhr, Burscheid; Peter Wild, Alten-Buseck; Horst Nickel, Leverkusen, all of Fed. Rep. of Germany

[73] Assignee: Bayer Aktiengesellschaft, Leverkusen, Fed. Rep. of Germany

[21] Appl. No.: 334,613

[22] Filed: Dec. 28, 1981

[30] Foreign Application Priority Data

Jan. 15, 1981 [DE] Fed. Rep. of Germany ....... 3100978

[51] Int. Cl.³ ................... C07C 143/38; C07C 143/53
[52] U.S. Cl. ........................ 260/501.12; 260/465 D; 260/465 E; 260/507 R; 260/144; 260/174; 544/106; 544/351; 544/398; 544/400; 546/186; 546/190; 546/206; 546/264; 546/347; 548/524; 548/577; 548/578
[58] Field of Search .......... 260/501.12, 465 D, 465 E; 546/347, 264, 206, 190, 186; 544/400, 398, 351, 106; 548/523, 569, 524, 577, 578

[56] References Cited

U.S. PATENT DOCUMENTS 4,196,143  4/1980  Strycker .................... 260/501.12

Primary Examiner—Nicky Chan
Attorney, Agent, or Firm—Sprung, Horn, Kramer & Woods

[57] ABSTRACT

Compounds which contain ammonium groups and sulphonic acid groups and which, in the betaine form, correspond to the formula

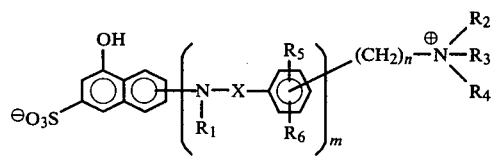

wherein
X denotes —CO— or —SO$_2$—,
R$_1$ denotes hydrogen or alkyl,
R$_2$, R$_3$ and R$_4$, independently of one another denote alkyl, alkenyl or aralkyl, or
R$_4$ denotes

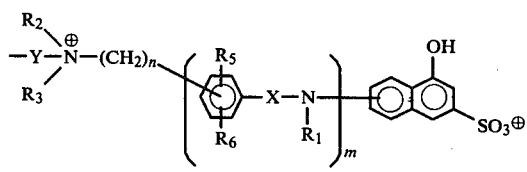

Y denotes alkylene or xylylene,
m denotes 1 or 2,
n denotes 0 or 1, and
R$_5$ and R$_6$, independently of one another, denote hydrogen, alkyl, alkoxy or halogen,
and in addition, if n=1,
R$_2$ or R$_4$ denotes amino, alkylamino, dialkylamino, aryl or cycloalkyl,
R$_2$ and R$_3$, together with the nitrogen atom which is bonded to them, denote a 5-membered or 6-membered ring,
R$_2$, R$_3$ and R$_4$, together with the nitrogen atom which is bonded to them, denote a pyridinium ring, a group of the formula

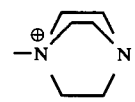

or hydrogen,
Y denotes arylene, benzylene or a radical of the formula

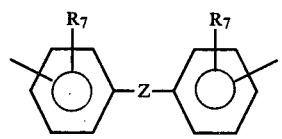

Z denotes a direct bond, —(CH$_2$)$_p$—, —O—, —O—(CH$_2$)$_p$—O—, —SO$_2$—, —NHCO—, —NHCONH—, —NHCO—(CH$_2$)$_p$—CONH— or —CONH—(CH$_2$)$_p$—NHCO—,
p denotes 1, 2 or 3, and
R$_7$ denotes hydrogen, alkyl, alkoxy or halogen,
and wherein the cyclic and acyclic radicals can contain non-ionic substituents, their preparation and their use as coupling components in the preparation of azo dyestuffs.

4 Claims, No Drawings

NAPHTHOLSULPHONIC ACID COMPOUNDS, THEIR PREPARATION AND USE AS COUPLING COMPONENTS

The present invention relates to compounds containing ammonium and sulphonic acid groups, which compounds, in the betaine form, correspond to the formula

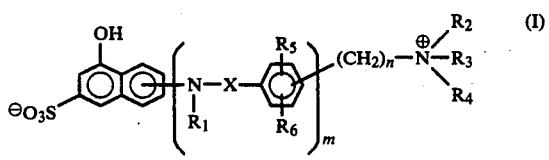

wherein

X denotes —CO— or —SO$_2$—,

R$_1$ denotes hydrogen or alkyl,

R$_2$, R$_3$ and R$_4$, independently of one another, denote alkyl, alkenyl or aralkyl, or R$_4$ denotes

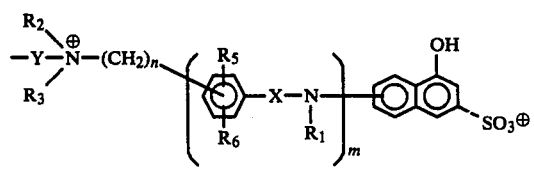

Y denotes alkylene or xylylene, m denotes 1 or 2, n denotes 0 or 1, and

R$_5$ and R$_6$, independently of one another, denote hydrogen, alkyl, alkoxy or halogen, and in addition, if n=1, R$_2$ or R$_4$ denotes amino, alkylamino, dialkylamino, aryl or cycloalkyl, R$_2$ and R$_3$, together with the nitrogen atom which is bonded to them, denote a 5-membered or 6-membered ring, R$_2$, R$_3$ and R$_4$, together with the nitrogen atom which is bonded to them, denote a pyridinium ring, a group of the formula

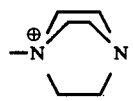

or hydrogen,

Y denotes arylene, benzylene or a radical of the formula

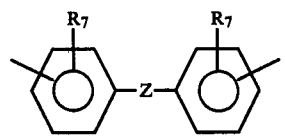

Z denotes a direct bond, —(CH$_2$)$_p$—, —O—, —O—(CH$_2$)$_p$—O—, —SO$_2$—, —NHCO—, —NH—CONH—, —NHCO—CH$_2$)$_p$—CONH— or —CONH—(CH$_2$)$_p$—NHCO—, p denotes 1, 2 or 3, and R$_7$ denotes hydrogen, alkyl, alkoxy or halogen, and wherein the cyclic and acyclic radicals can contain non-ionic substituents.

Non-ionic substituents in the context of the present invention are the non-dissociating substituents, such as, for example, cyano, hydroxyl, halogen, such as fluorine, chlorine or bromine, alkyl and alkoxy, alkyl and alkoxy preferably containing 1–4 C atoms.

Substituents of the alkyl radicals R$_1$–R$_7$ are, for example, halogen, hydroxyl, C$_1$–C$_4$-alkoxy or cyano.

Halogen preferably represents fluorine, chlorine or bromine.

In general, alkyl radicals are understood, in particular, as meaning those having 1–8 C atoms, and alkenyl radicals are understood as meaning those having 2–4 C atoms.

Cycloalkyl represents, for example, optionally C$_1$–C$_4$-alkyl-substituted cyclopentyl or cyclohexyl.

Aryl is preferably understood as meaning phenyl, and aralkyl as meaning benzylethyl and phenylethyl. The phenyl rings can be substituted, for example, by 1–3 non-ionic radicals, such as halogen, C$_1$–C$_4$-alkyl, C$_1$–C$_4$-alkoxy or cyano.

The radicals R$_2$ and R$_3$, together with the nitrogen atom, to which they are bonded, form optionally C$_1$–C$_4$-alkyl-substituted pyrrolidine, piperidine, morpholine, piperazine or N-hydroxyethyl-piperazine.

Among the compounds of the formula (I), those which may be particularly mentioned are those of the formula

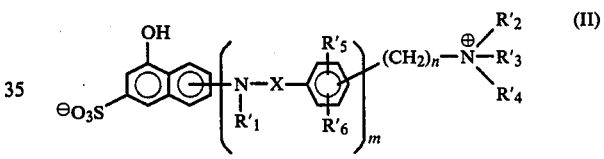

wherein

X denotes —CO— or —SO$_2$—,

R$_1$' denotes hydrogen or C$_1$–C$_4$-alkyl which is optionally substituted by hydroxyl, halogen, cyano or C$_1$–C$_4$-alkoxy, R$_2$', R$_3$' and R$_4$' independently of one another, denote C$_1$–C$_4$-alkyl which is optionally substituted by hydroxyl, halogen, cyano or C$_1$–C$_4$-alkoxy, C$_2$–C$_4$-alkenyl, or benzyl or phenylethyl which is optionally substituted by halogen, C$_1$–C$_4$-alkyl or C$_1$–C$_4$-alkoxy, or R$_4$' denotes

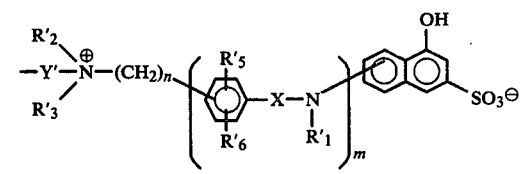

Y' denotes C$_1$–C$_8$-alkyl which is optionally substituted by hydroxyl, halogen, cyano or C$_1$–C$_4$-alkoxy, or xylylene which is optionally substituted by halogen, C$_1$–C$_4$-alkyl or C$_1$–C$_4$-alkoxy, m denotes 1 or 2, n denotes 0 or 1, and R$_5$' and R$_6$', independently of one another, denote hydrogen, C$_1$–C$_4$-alkyl, C$_1$–C$_4$-alkoxy or halogen, and in addition, if n=1, $R_2'$ or $R_4'$ denotes amino, $C_1$-$C_4$-alkylamino or $C_1$-$C_4$-dialkylamino which is optionally substituted by hydroxyl, halogen, cyano or $C_1$-$C_4$-alkoxy, phenyl which is optionally substituted by hydroxyl, halogen, cyano, $C_1$-$C_4$-alkyl or $C_1$-$C_4$-alkoxy, or optionally $C_1$-$C_4$-alkyl-substituted cyclopentyl or cyclohexyl, $R_2'$ and $R_3'$, together with the N atom which is bonded to them, denote an optionally $C_1$-$C_4$-alkyl-substituted pyrrolidine, piperidine, morpholine, piperazine or N-hydroxyethylpiperazine, $R_2'$, $R_3'$ and $R_4'$, together with the N atom which is bonded to them, denote a pyridinium ring, a group of the formula

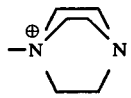

or hydrogen, and $Y'$ denotes phenylene which is optionally substituted by hydroxyl, halogen, cyano, $C_1$-$C_4$-alkyl or $C_1$-$C_4$-alkoxy, benzylene or a radical of the formula

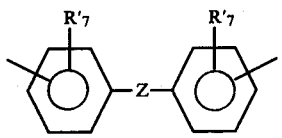

$R_7'$ denotes hydrogen, $C_1$-$C_4$-alkyl, $C_1$-$C_4$-alkoxy or halogen, and

Z and p have the meaning of formula (I).

In preferred compounds (II), X represents CO.

Among these compounds, those which may in turn be particularly mentioned are those of the formula

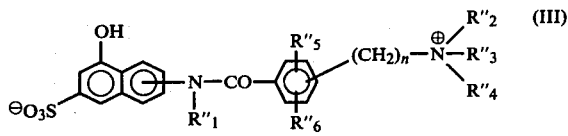

wherein $R_1''$ denotes hydrogen or methyl, $R_2''$, $R_3''$ and $R_4''$, independently of one another, denote $C_1$-$C_4$-alkyl which is optionally substituted by hydroxyl, chlorine, bromine, cyano or $C_1$-$C_4$-alkoxy, $C_2$-$C_4$-alkenyl, or benzyl or phenylethyl which is optionally substituted by chlorine, bromine, $C_1$-$C_4$-alkyl or $C_1$-$C_4$-alkoxy, or $R_4''$ denotes

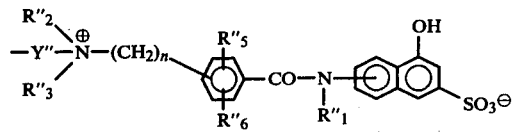

$Y''$ denotes $C_1$-$C_4$-alkyl which is optionally substituted by hydroxyl, chlorine, bromine, cyano or $C_1$-$C_4$-alkoxy, or xylylene which is optionally substituted by chlorine, bromine, $C_1$-$C_4$-alkyl or $C_1$-$C_4$-alkoxy, n denotes 0 or 1, and $R_5''$ and $R_6''$, independently of one another, denote hydrogen, methyl, methoxy, ethoxy or chlorine, and in addition, if n=1, $R_2''$ or $R_4''$ denote amino, phenyl which is optionally substituted by hydroxyl, chlorine, bromine, cyano, $C_1$-$C_4$-alkyl or $C_1$-$C_4$-alkoxy, or optionally $C_1$-$C_4$-alkyl-substituted cyclopentyl or cyclohexyl, $R_2''$ and $R_3''$, together with the N atom which is bonded to them, denote a pyrrolidine, piperidine, morpholine, piperazine, N-methyl-piperazine or N-hydroxyethylpiperazine, and $R_2''$, $R_3''$ and $R_4''$, together with the N atom which is bonded to them, denote a pyridinium ring or hydrogen.

In preferred compounds (III), n represents O.

Of particular interest are compounds of the formula

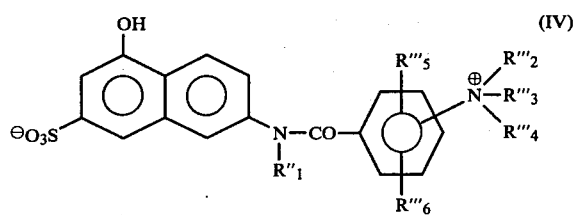

wherein $R_1''$ has the meaning mentioned above, $R_2'''$, $R_3'''$ and $R_4'''$, independently of one another, denote $C_1$-$C_4$-alkyl which is optionally substituted by hydroxyl, chlorine, bromine, cyano or $C_1$-$C_4$-alkoxy, $C_2$-$C_4$-alkenyl, or benzyl or phenylethyl which is optionally substituted by chlorine, bromine, $C_1$-$C_4$-alkyl or $C_1$-$C_4$-alkoxy, and $R_5'''$ and $R_6'''$, independently of one another, denote hydrogen, methyl, methoxy, ethoxy, chlorine or bromine.

The invention also relates to the preparation of the compounds (I). The preparation is effected by known processes, in a customary manner. In the preparation, starting substances are, for example, the naphtholsulphonic acids of the formula

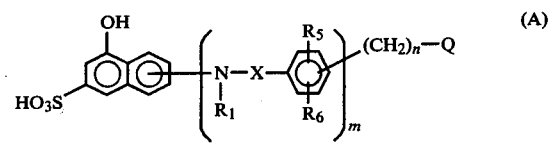

wherein

Q denotes

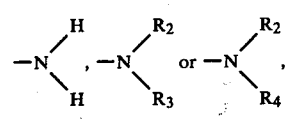

and

X, $R_1$-$R_6$, m and n have the meaning mentioned above.

The compounds of the formula (I) are obtained by quaternisation, or stepwise N-alkylation and subsequent quaternisation, and, as the betaines, are generally sparingly soluble and easy to isolate. Alkyl halides, β-halogenopropionitriles, halohydrins, alkylene oxides, alkyl esters of sulphuric acid or alkyl esters of organic sulphonic acids, such as methyl chloride, methyl bromide, methyl iodide, ethyl chloride, ethyl bromide, ethyl iodide, propyl bromide, propyl iodide, benzyl chloride, benzyl bromide, β-chloropropionitrile, ethylene chlorohydrin, ethylene oxide, propylene oxide, dimethyl sulphate, diethyl sulphate, methyl benzenesulphonate, methyl, ethyl, propyl or butyl p-toluenesulphonate, allyl chloride, allyl bromide, methallyl chloride, methallyl bromide, trimethyloxonium boron fluoride, 1,4-dichloro-2-propene, 1-chloro-2-butene, 1,2-dichloro-2-propene and acrylonitrile, are examples of suitable N-alkylating agents.

The reaction can be carried out either in water or in an organic solvent, for example in acetone, methyl ethyl ketone or dimethylformamide, but preferably in water.

Magnesium oxide, magnesium carbonate, sodium carbonate, calcium carbonate, sodium bicarbonate or sodium hydroxide solution can be employed, for example, as the acid-binding agent. The alkylations are usually carried out at room temperature; the quaternisations can either also be carried out at this temperature or at an elevated temperature, and, if appropriate, under pressure.

Compounds of the formula (I) can also be obtained by a process in which halides of the formula

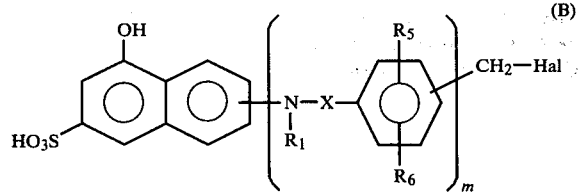

(B)

wherein

Hal denotes chlorine, bromine or iodine, and X, $R_1$, $R_5$, $R_6$ and m have the abovementioned meaning, are reacted with compounds of the formula

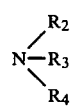

wherein $R_2$, $R_3$ and $R_4$ have the meaning mentioned in formula (I).

A further possibility for preparing compounds of the formula (I) is the reaction of naphtholsulphonic acids of the formula

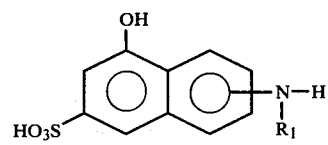

(C)

wherein $R_1$ has the meaning mentioned above, with carboxylic acid derivatives or sulphonic acid derivatives of the general formula

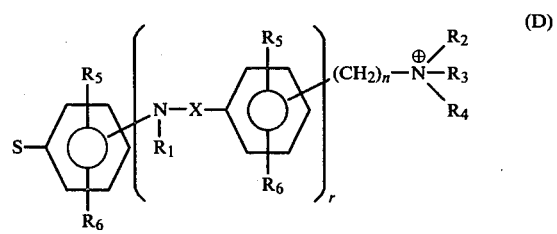

(D)

wherein

S denotes a carboxylic acid derivative or sulphonic acid derivative, preferably an acid chloride, r denotes 0 or 1, and X, $R_1$–$R_6$ and n have the meaning mentioned above.

The compounds of the formula (I) are valuable coupling components in dyestuff chemistry.

EXAMPLE 1

145 g (0.4 mol) of 7-[(4-aminobenzoyl)-amino]-4-hydroxy-2-naphthalenesulphonic acid are suspended in 700 ml of $H_2O$ and are dissolved to form a neutral solution, using 40% strength NaOH solution. 160 ml of dimethylsulphate are then added dropwise to the solution during the course of half an hour, so that the temperature does not increase above 35° C. The pH value of the mixture is kept between 6 and 7 by dropwise addition of approximately 350 ml of 20% strength sodium carbonate solution. The mixture is further stirred for one hour, then heated to 100° C. in order to decompose excess dimethylsulphate and allowed to cool, and the precipitated product is isolated. 220 g of a moist paste are obtained, which can be further used as such. The resulting compound (melting point >300° C., decomposition) corresponds, according to an NMR spectroscopic investigation, to the formula (1). The compound dissolves in 20% sodium carbonate solution. Paper chromatographic $R_f$ value: 0.56 (eluant:butanol/pyridine/water/ammonia in the ratio of 40:50:40:10). By reaction with a diazo component, a yield of 95% can be determined.

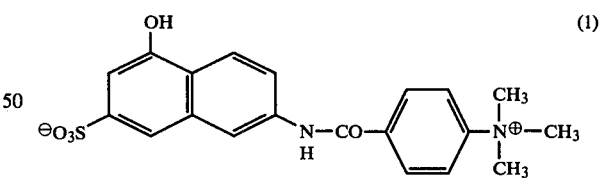

(1)

EXAMPLE 2

7-[(3-Aminobenzoyl)-amino]-4-hydroxy-2-naphthalenesulphonic acid is reacted analogously to Example 1, and the product of the formula (2) is obtained.

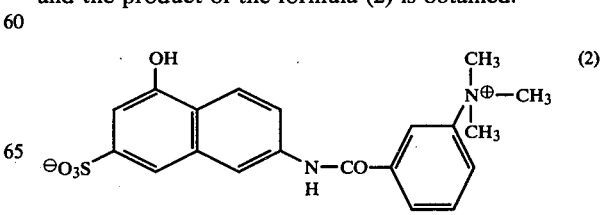

(2)

EXAMPLE 3

36 g (0.14 mol) of 4-hydroxy-7-(methylamino)-2-naphthalenesulphonic acid in 300 ml of H$_2$O are dissolved, at pH 6, using 40% strength NaOH solution. 29.5 g of 4-nitrobenzoyl chloride in 200 ml of ice water are stirred with emulsifier L5 and added to the solution. The pH value of the mixture is kept at 6 with 20% strength sodium carbonate solution. The reaction has ended after 3 hours. The mixture is then warmed to 40° C., 35 g of Na$_2$S are added to it, and the pH is adjusted to 10 with bicarbonate solution. The reduction has ended after 2 hours. The mixture is adjusted to pH 2 with HCl, is further stirred for 1 hour, the pH is adjusted to 9 with 40% strength NaOH solution and the mixture is clarified of sulphur. The solution is again adjusted to pH 2 with HCl, and the precipitated product is isolated. The quaternisation is effected analogously to Example 1, and the product of the formula (3) is obtained.

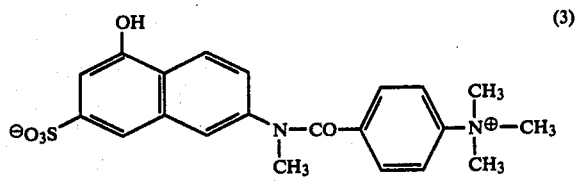

EXAMPLE 4

6-Amino-4-hydroxy-2-naphthalenesulphonic acid is reacted analogously to Example 3 and the product of the formula (4) is obtained.

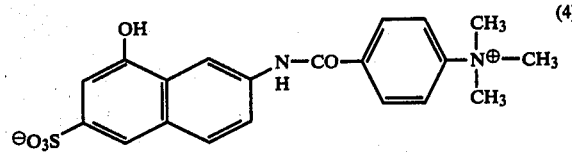

EXAMPLE 5

24.9 g (0.05 mol) of 7-[[(4-[(4aminobenzoyl)-amino]-benzoyl]-amino]-4-hydroxy-2-naphthalenesulphonic acid are dissolved in 200 ml of dimethylformamide and 16 g of solid potassium carbonate are added to the solution. 30 ml of dimethylsulphate are added dropwise to the mixture and the latter is warmed to 60° C. After the end of the reaction, according to thin layer chromatography, 25 ml of H$_2$O are added to the mixture, and the latter is heated to 100° C., allowed to cool and filtered, and a product of the formula (5) is obtained.

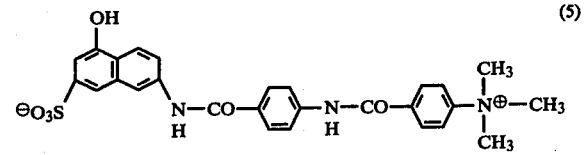

EXAMPLE 6

(a) 89.5 g (0.25 mol) of 7-[(4-aminobenzoyl)-amino]-4-hydroxy-2-naphthalenesulphonic acid are dissolved in 400 ml of dimethylformamide and 75 g of solid potassium carbonate are added to the solution. 70 ml of dimethylsulphate are then added dropwise to the mixture during the course of 4 hours, and the mixture is further stirred for 2 hours. After the customary decomposition of the excess dimethylsulphate, 190.5 g of paste of a product of the formula (6) are isolated.

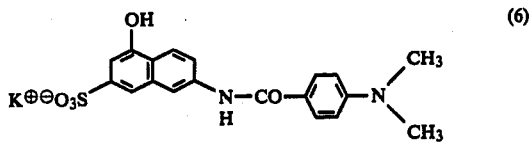

(b) 77 g of paste of the compound (6) are suspended in 200 ml of water (pH 6–7), and 14 ml of diethylsulphate are then added dropwise to the mixture at room temperature, during the course of half an hour. The mixture is stirred for 5 hours and heated to 100° C. for 2 hours, and 170 ml of a solution of the compound of the formula (7) are obtained.

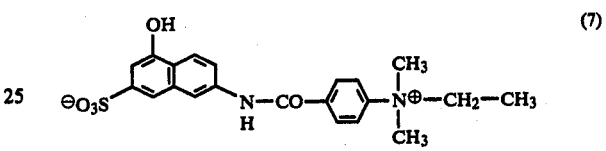

(c) 19 g of paste of the compound (6) are suspended in 50 ml of water. 3 ml of propylene oxide are added very slowly to the suspension. The pH value is kept at 7 with 28% strength HCl; the reaction temperature is 50°–60° C. A product of the formula (8) is obtained.

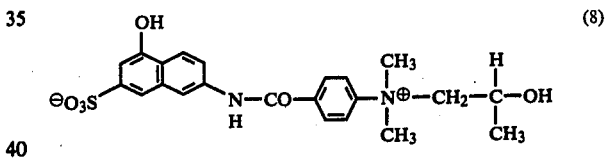

(d) 19 g of paste and the compound (6) are suspended in 50 ml of water (pH 7) and 3.7 ml of benzyl chloride are added dropwise to the suspension at 50°–60° C. After a reaction time of 3 hours, a product of the formula (9) is obtained.

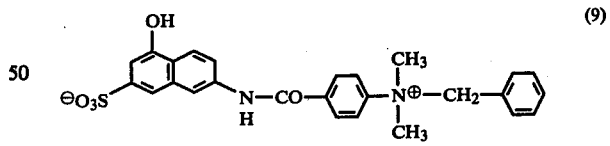

We claim:
1. A naphtholsulphonic acid substituted with an ammonium group and, in the betaine form, corresponding to the formula

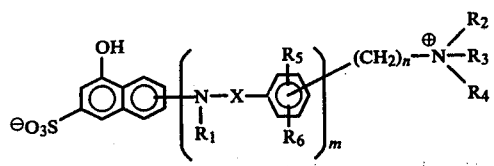

wherein
X is —CO— or —SO$_2$—, $R_1$ is hydrogen or alkyl,
$R_2$ and $R_3$ each independently is alkyl, alkenyl or phenylalkyl,
$R_4$ is alkyl, alkenyl, phenylalkyl or

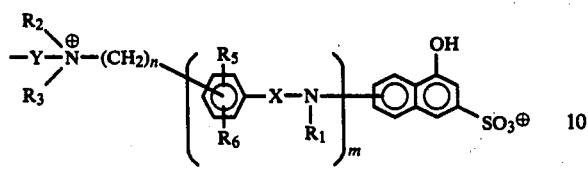

Y is alkylene or xylylene,
m is 1 or 2,
n is 0 or 1,
$R_5$ and $R_6$ each independently is hydrogen, alkyl, alkoxy or halogen,
and in addition, if n=1,
$R_2$ or $R_4$ may be amino, alkylamino, dialkylamino, cycloalkyl, phenyl, or phenyl substituted by halogen, $C_{1-4}$-alkyl, $C_{1-4}$-alkoxy or cyano,
$R_2$ and $R_3$, together with the nitrogen atom to which they are bonded may form optionally $C_1-C_4$-alkyl-substituted pyrrolidine, piperidine, morpholine, piperazine or N-hydroxyethyl-piperazine,
$R_2$, $R_3$ and $R_4$, together with the nitrogen atom to which they are bonded may form a pyridinium ring, or a group of the formula

$R_2$, $R_3$ and $R_4$ may be hydrogen,
Y is phenylene, which is optionally substituted by hydroxyl, halogen, cyano, $C_{1-4}$-alkyl or $C_1-C_4$-alkoxy, benzylene or a radical of the formula

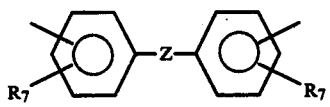

Z is a direct bond, $-(CH_2)_p-$, $-O-$, $-O-(CH_2)_p-O$, $-SO_2-$, $-NHCO-$, $-NHCONH-$, $-NHCO-(CH_2)_p-CONH-$ or $-CONH-(CH_2)_p-NHCO-$,
p is 1, 2 or 3, and
$R_7$ is hydrogen, alkyl, alkoxy or halogen.

2. A substituted naphtholsulphonic acid which, in the betaine form is of the formula

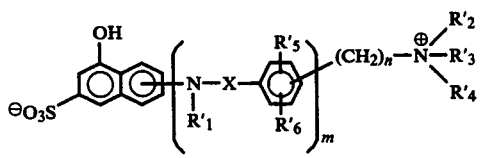

wherein
X is $-CO-$ or $-SO_2-$,
$R_1'$ is hydrogen or $C_1-C_4$-alkyl which is optionally substituted by hydroxyl, halogen, cyano or $C_1-C_4$-alkoxy,
$R_2'$, $R_3'$ and $R_4'$, each independently is $C_1-C_4$-alkyl which is optionally substituted by hydroxyl, halogen, cyano or $C_1-C_4$-alkoxy, $C_2-C_4$-alkenyl, or benzyl or phenylethyl which is optionally substituted by halogen, $C_1-C_4$-alkyl or $C_1-C_4$-alkoxy, or
$R_4'$ may be

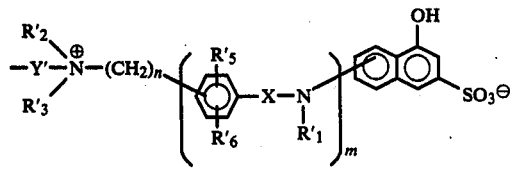

Y' is $C_1-C_8$-alkylene which is optionally substituted by hydroxyl, halogen, cyano or $C_1-C_4$-alkoxy, or xylylene which is optionally substituted by halogen, $C_1-C_4$-alkyl or $C_1-C_4$-alkoxy,
m is 1 or 2,
n is 0 or 1, and
$R_5'$ and $R_6'$, each independently is hydrogen, $C_1-C_4$-alkyl, $C_1-C_4$-alkoxy or halogen,
and in addition, if n=1,
$R_2'$ or $R_4'$ may be amino, $C_1-C_4$-alkylamino or $C_1-C_4$-dialkylamino which is optionally substituted by hydroxyl, halogen, cyano or $C_1-C_4$-alkoxy, phenyl which is optionally substituted by hydroxyl, halogen, cyano, $C_1-C_4$-alkyl or $C_1-C_4$-alkoxy, or optionally $C_1-C_4$-alkyl-substituted cyclopentyl or cyclohexyl, or
$R_2'$ and $R_3'$, together with the N atom to which they are bonded form optionally $C_1-C_4$-alkyl-substituted pyrrolidine, piperidine, morpholine, piperazine or N-hydroxyethylpiperazine, or
$R_2'$, $R_3'$ and $R_4'$, together with the N atom to which they are bonded form a pyridinium ring, or a group of the formula

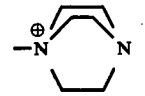

or $R_2'$, $R_3'$ and $R_4'$ may be hydrogen, and
Y' is phenylene which is optionally substituted by hydroxyl, halogen, cyano, $C_1-C_4$-alkyl or $C_1-C_4$-alkoxy, benzylene or a radical of the formula

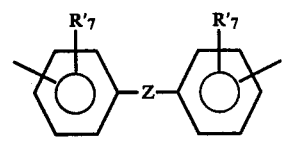

$R_7'$ denotes hydrogen, $C_1-C_4$-alkyl, $C_1-C_4$-alkoxy or halogen, and
Z is a direct bond, $-(CH_2)_p-$, $-O-$, $-O-(CH_2)_p-O$, $-SO_2-$, $-NHCO-$, $-NHCONH-$, $-NHCO-(CH_2)_p-CONH-$ or $-CONH-(CH_2)_p-NHCO-$ and
p is 1, 2 or 3.

3. A substituted naphtholsulphonic acid according to claim 2, wherein:
m is 1,
$R_1'$ is hydrogen or methyl,
$R_2'$, $R_3'$ and $R_4'$, each independently is $C_1-C_4$-alkyl which is optionally substituted by hydroxyl, chlorine, bromine, cyano or $C_1$-$C_4$-alkoxy, $C_2$-$C_4$-alkenyl, or benzyl or phenylethyl which is optionally substituted by chlorine, bromine, $C_1$-$C_4$-alkyl or $C_1$-$C_4$-alkoxy, or $R_4'$ may be

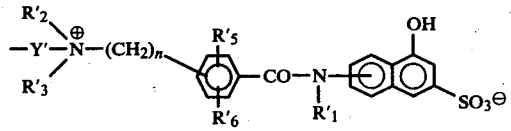

$Y'$ is $C_1$-$C_4$-alkylene which is optionally substituted by hydroxyl, chlorine, bromine, cyano or $C_1$-$C_4$-alkoxy, or xylylene which is optionally substituted by chlorine, bromine, $C_1$-$C_4$-alkyl or $C_1$-$C_4$-alkoxy, and $R_5'$ and $R_6'$, each independently is hydrogen, methyl, methoxy, ethoxy or chlorine, and in addition, if $n=1$, $R_2'$ or $R_4'$ is amino, phenyl which is optionally substituted by hydroxyl, chlorine, bromine, cyano, $C_1$-$C_4$-alkyl or $C_1$-$C_4$-alkoxy, or optionally $C_1$-$C_4$-alkyl-substituted cyclopentyl or cyclohexyl, or $R_2'$ and $R_3'$, together with the N atom to which they are bonded form pyrrolidine, piperidine, morpholine, piperazine, N-methyl-piperazine or N-hydroxyethylpiperazine, or $R_2'$, $R_3'$ and $R_4'$, together with the N atom to which they are bonded form a pyridinium ring, or $R_2'$, $R_3'$ and $R_4'$ are hydrogen.

4. Naphtholsulphonic acid compounds which, in the betaine form, correspond to the general formula

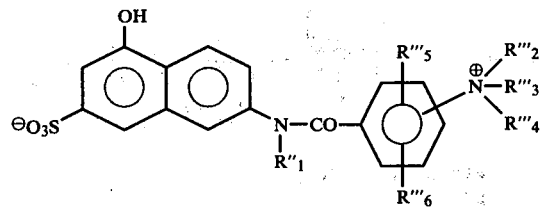

wherein $R_1''$ denotes hydrogen or methyl, $R_2'''$, $R_3'''$ and $R_4'''$, independently of one another, denote $C_1$-$C_4$-alkyl which is optionally substituted by hydroxyl, chlorine, bromine, cyano or $C_1$-$C_4$-alkoxy, $C_2$-$C_4$-alkenyl, or benzyl or phenylethyl which is optionally substituted by chlorine, bromine, $C_1$-$C_4$-alkyl or $C_1$-$C_4$-alkoxy, and $R_5'''$ and $R_6'''$, independently of one another, denote hydrogen, methyl, methoxy, ethoxy, chlorine or bromine.

* * * * *

UNITED STATES PATENT AND TRADEMARK OFFICE
CERTIFICATE OF CORRECTION

PATENT NO. : 4,435,334
DATED : March 6, 1984
INVENTOR(S) : Frank-Michael Stohr et al It is certified that error appears in the above-identified patent and that said Letters Patent is hereby corrected as shown below:

| | |
|---|---|
| Abstract, line 8 | After "another" insert --,-- |
| Col. 1, line 66 | Delete "(—NHCO-CH$_2$)" and substitute -- -NHCO-(CH$_2$)-- |
| Col. 4, line 34 | Insert -- - -- between "4" and --alkoxy" |
| Col. 7, line 45 | Insert -- - -- Between "4" and "aminobenzoyl" |
| Col. 9, line 10 | End of formula delete "∖SO$_3$⊕" and substitute -- ∖SO$_3$⊖ -- |

Signed and Sealed this

Twenty-ninth Day of May 1984

[SEAL]

Attest:

Attesting Officer

GERALD J. MOSSINGHOFF

Commissioner of Patents and Trademarks